United States Patent
Zeng et al.

(10) Patent No.: US 11,592,574 B2
(45) Date of Patent: Feb. 28, 2023

(54) LIDAR VISION SYSTEMS

(71) Applicant: GM GLOBAL TECHNOLOGY OPERATIONS LLC, Detroit, MI (US)

(72) Inventors: Wei Zeng, Oakland Township, MI (US); Shuqing Zeng, Sterling Heights, MI (US); Scott E. Parrish, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 630 days.

(21) Appl. No.: 16/711,724

(22) Filed: Dec. 12, 2019

(65) Prior Publication Data

US 2021/0181350 A1    Jun. 17, 2021

(51) Int. Cl.
   *H04B 10/00*      (2013.01)
   *G01S 17/931*     (2020.01)
   *G01S 7/481*      (2006.01)

(52) U.S. Cl.
   CPC .......... *G01S 17/931* (2020.01); *G01S 7/4813* (2013.01); *G01S 7/4816* (2013.01); *G01S 7/4817* (2013.01)

(58) Field of Classification Search
   CPC ..... H04B 10/11; H04B 10/112; H04B 10/114; H04B 10/1143; H04B 10/1149; H04B 10/40; G01S 7/4817; G01S 7/4816; G01S 7/4813; G01S 7/4865; G01S 17/931; G01S 17/42; G01S 17/89; G01S 17/936
   USPC ....... 398/169, 170, 118, 119, 127, 128, 129, 398/130, 131, 135, 136, 158, 159; 356/4.01, 5.01, 3.01, 4.1
   See application file for complete search history.

(56) References Cited

U.S. PATENT DOCUMENTS

| | | | | |
|---|---|---|---|---|
| 8,836,922 | B1 * | 9/2014 | Pennecot | G01S 7/4815 356/9 |
| 9,625,582 | B2 * | 4/2017 | Gruver | G01S 7/4815 |
| 2020/0249324 | A1 * | 8/2020 | Steinberg | G01S 7/4911 |

\* cited by examiner

*Primary Examiner* — Hanh Phan
(74) *Attorney, Agent, or Firm* — Lorenz & Kopf LLP (57) ABSTRACT

In an exemplary embodiment, a LiDAR is provided that is configured for installation in a mobile platform. The LiDAR includes a scanner and a light-intensity receiver. The scanner includes a light source configured to direct illumination in an illuminating direction. The light-intensity receiver includes one or more light-intensity sensors; and one or more lens assemblies configured with respect to the one or more light-intensity sensors, such that that at least one sensor plane from the one or more light-intensity sensors is tilted to form a non-zero angle with at least one equivalent lens plane from the one or more lens assemblies, transferring the sensor focal plane to be align with the main light illumination direction and be consistent with the direction of movement of a mobile platform.

20 Claims, 7 Drawing Sheets

LIDAR VISION SYSTEMS

TECHNICAL FIELD

The technical field generally relates to the field of mobile platforms and, more specifically, to vehicle (or mobile platform) light detection and ranging (LiDAR) systems.

BACKGROUND

Certain vehicles include one or more vehicle LiDARs that may measure distance to an object by illuminating the object with laser light and detecting the reflected light with a sensor installed in the LiDAR receiver. The LiDAR system may determine the depth information of objects surrounding vehicle that are provided to one or more vehicle systems in a point-cloud format for sensor fusion, such as autonomous driving perception systems. Such vehicle LiDARs may have a limited light receiving efficiency for targets at far field, such that it fails to detect some objects outside of a certain region near the vehicle, or rely on the use of high-energy laser sources and/or large apertures to enhance light receiving efficiency to enable target detection at far field.

Accordingly, it is desirable to enhance LiDAR visibility to increase LiDAR light receiving efficiency of backscattering echo of illumination for vehicles (or other mobile platforms), including with an improved LiDAR receiver optical layout (sensors and lenses layout) to achieve a theoretically infinite depth of field (DoF). It is also important for the LiDAR receiver optical layout to maintain sufficiently large field of view to handle road topography changes while achieving the theoretically infinite DoF. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a LiDAR is provided that is configured for installation in a mobile platform. The LiDAR includes a laser scanner and a light-intensity receiver. The scanner includes a light source configured to direct illumination in an illuminating direction. The light-intensity receiver includes: one or more light-intensity sensors; and one or more lens assemblies configured with respect to the one or more light-intensity sensors, such that that at least one sensor plane from the one or more light-intensity sensors is tilted to form a non-zero angle between zero and ninety degrees with at least one equivalent lens plane from the one or more lens assemblies.

Also in one embodiment, the light-intensity sensor includes a focal plane; the focal plane makes a non-zero angle with respect to the equivalent lens plane from the lens assembly and the sensor plane at a single point; and the focal plane intersects both the sensor plane and the lens plane at a single point.

Also in one embodiment, the focal plane is: aligned with a main LiDAR light illumination direction and a direction of movement of a vehicle platform in which the LiDAR is installed; and parallel to an edge plane of the field of view of the LiDAR receiver.

Also in one embodiment, the focal plane extends a theoretically infinite distance from the vehicle in both the light illuminating direction and vehicle movement direction.

Also in one embodiment, the one or more light-intensity sensors include a single light-intensity sensor; and the one or more lens assemblies include a single lens assembly.

Also in one embodiment, the one or more light-intensity sensors include a first light-intensity sensor and a second light-intensity sensor; the one or more lens assemblies include a single lens assembly; the combination of the first and second light-intensity sensors have a vertical angle of view (also known as vertical field of view) greater than forty degrees; the first light-intensity sensor has a first sensor plane; the second light-intensity sensor has a second sensor plane; and the single lens assembly has an equivalent lens plane that forms a non-zero angle with both the first sensor plane and the second sensor plane.

Also in one embodiment, the light-intensity receiver further includes a mirror disposed to separate the first light-intensity sensor and the second light-intensity sensor.

Also in one embodiment, the one or more light-intensity sensors include a single light-intensity sensor; the one or more lens assemblies include a first lens assembly and a second lens assembly; a vertical angle of view of the single light-intensity sensor is greater than forty degrees; the first lens assembly has a first equivalent lens plane; the second lens assembly has a second equivalent lens plane; and each of the first lens plane and the second lens plane form a non-zero angle with the sensor plane.

In another exemplary embodiment, a vehicle is provided that includes a body and a LiDAR that is disposed on the body. The LiDAR includes a scanner and a light-intensity receiver. The light-intensity receiver includes one or more light-intensity sensors; and one or more lens assemblies configured with respect to the one or more light-intensity sensors, such that that at least one sensor plane from the one or more light-intensity sensors is tilted to form a non-zero angle with at least one equivalent lens plane from the one or more lens assemblies.

Also in one embodiment, the LiDAR includes a focal plane for the one or more light-intensity sensors; the focal plane makes a non-zero angle with respect to the equivalent lens plane from the lens assembly and the sensor plane at a single point; and the focal plane intersects both the sensor plane and lens plane at a single point.

Also in one embodiment, the one or more light-intensity sensors of the LiDAR receiver include a single light-intensity sensor; and the one or more lens assemblies from the LiDAR receiver include a single lens assembly.

Also in one embodiment, the sensor of the LiDAR receiver is tilted to form an angle that is greater than or equal to zero degrees and that is less than or equal to twenty degrees between the focal plane and the road surface to handle road topography changes while achieving a theoretically infinite depth of field for the LiDAR receiver sensor; and the light illumination angle of the LiDAR scanner is titled that an entire LiDAR light illumination volume from near to far field is around a sharpest focal plane of the LiDAR receiver sensor.

Also in one embodiment, the one or more light-intensity sensors of the LiDAR receiver include a first light-intensity sensor and a second light-intensity sensor; the one or more lens assemblies of the LiDAR receiver include a single lens assembly; the first light-intensity sensor has a first sensor plane; the second light-intensity sensor has a second sensor plane; and the single lens assembly has an equivalent lens plane that forms a non-zero angle with both the first sensor plane and the second sensor plane.

Also in one embodiment, a vertical angle of view of the LiDAR receiver is greater than forty degrees to handle road topography changes while achieving a theoretically infinite depth of field for the LiDAR receiver.

Also in one embodiment, the light-intensity receiver further includes: a mirror disposed to separate the first sensor and the first sensor to eliminate the gap between the two sensors; and the vertical angle of view of the receiver is greater than forty degrees to handle road topography changes while achieving a theoretically infinite depth of field for the LiDAR receiver.

Also in one embodiment, the one or more light-intensity sensors from the LiDAR receiver include a single light-intensity sensor; the one or more lens assemblies from the LiDAR receiver include a first lens assembly and a second lens assembly; the first lens assembly has a first equivalent lens plane; the second lens assembly has a second equivalent lens plane; and each of the first lens plane and the second lens plane forms a non-zero angle with the receiver-sensor plane.

Also in one embodiment, the combination of the first and second light-intensity sensors have a vertical angle of view greater than forty degrees to handle road topography changes while achieving a theoretically infinite depth of field for the LiDAR receiver.

In another exemplary embodiment, a vehicle is provided that includes a body and a LiDAR systems. The body includes a front portion and a roof. The LiDAR system includes one or more LiDARs disposed on the front portion of the body, the vehicle roof, or both. Each of the one or more LiDARs includes: a light source configured to direct illumination in an illuminating direction; and a LiDAR receiver including: one or more light-intensity sensors; and one or more lens assemblies configured with respect to the one or more light-intensity sensors, such that that at least one sensor plane from the one or more light-intensity sensors is tilted to form a non-zero angle between zero and ninety degrees with at least one equivalent lens plane from the one or more lens assemblies.

Also in one embodiment, the LiDAR system includes one or more spinning LiDARs disposed on the vehicle roof or one or more solid-state LiDARs disposed on the front portion of the body, the vehicle roof, or both.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
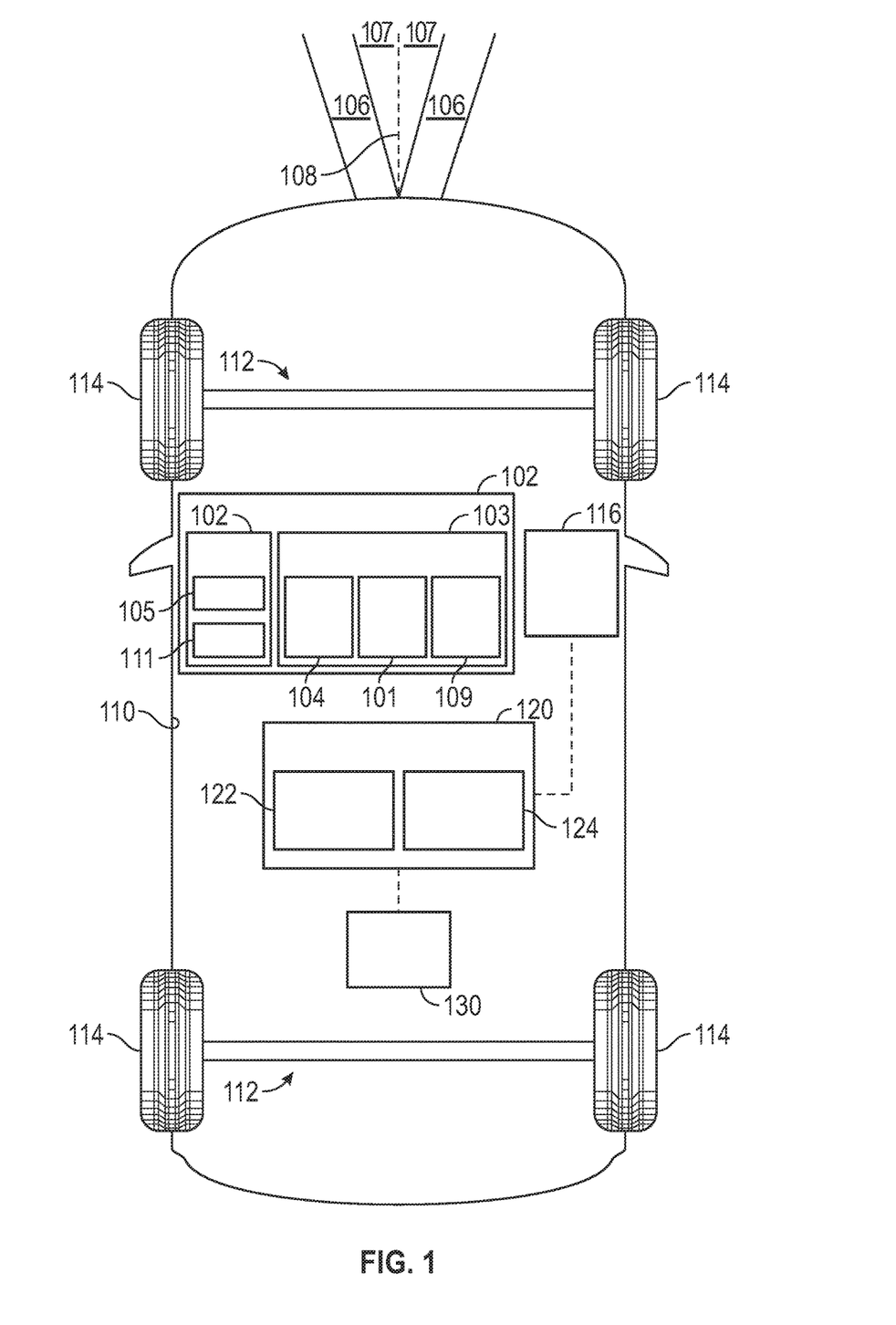
FIG. 1 is a functional block diagram of a vehicle that includes one or more LiDARs with a receiver focal plane that is aligned with a primary LiDAR illumination direction, in accordance with an exemplary embodiment.

FIG. 1 illustrates a vehicle 100, according to an exemplary embodiment. As described in greater detail further below, the vehicle 100 includes one or more LiDAR systems 102 mounted on the vehicle 100. As depicted in FIG. 1, in various embodiments, each LiDAR system 102 includes one or more respective scanners 101 and receivers 103.

In various embodiments, each scanner 101 is configured to direct illumination in a certain illuminating direction range. Also in various embodiments, each scanner 101 includes a light source 105 (and, in certain embodiments, a mirror 111). In addition, also in various embodiments, each receiver 103 comprises a light-intensity receiver that includes one or more light-intensity sensors 104 and lens assemblies 109, in various embodiments. It will be appreciated that in various embodiments a lens assembly includes, in certain embodiments, one or more optical lenses and filters.

As used throughout this Application, unless otherwise noted, (i) a "receiver" refers to a light-intensity receiver (also known as an echo signal receiver); (ii) a "sensor" refers to a light-intensity sensor (that includes image sensor); and (iii) a "light source" refers to a laser or any number of other different types of light sources.

In various embodiments, different components of the LiDAR system 102 (including the sensor 104, the lens assembly 109, and, in certain embodiments, one or more mirrors 113) are aligned in a particular manner to provide a focal plane 106 that is aligned with a primary illumination direction (e.g., a laser or other light source scanning angle) 107, that in various embodiments includes a direction of movement 108 of the vehicle 100, as described further below in greater detail in connection with FIGS. 2-8. In various embodiments, and as described in greater detail further below, one or more lens assemblies are configured with respect to the one or more light-intensity sensors, such that at least one sensor plane from the one or more light-intensity sensors is tilted to form a non-zero angle with at least one equivalent lens plane from the one or more lens assemblies.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle, an airplane, a marine vehicle, and/or one or more other types of vehicles. In addition, in various embodiments, it will also be appreciated that the vehicle 100 may comprise any number of other types of mobile platforms.

In the depicted embodiment, the vehicle 100 includes a body that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles).

A drive system 116 drives the wheels 114. The drive system 116 preferably comprises a propulsion system. In certain exemplary embodiments, the drive system 116 comprises an internal combustion engine and/or an electric motor/generator. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments the LiDAR(s) 102 may be disposed in various locations on or against the body 110 of the vehicle 100. For example, in certain embodiments, one or more LiDARs 102 (e.g., a solid state LiDAR) are disposed on a front portion of the vehicle 100 (e.g., near vehicle headlamp, behind and/or against a front windshield of the vehicle 100) and/or one or more LiDARs (e.g., a spinning LiDAR) may be disposed on a front portion of a body of the vehicle 100, or roof of the vehicle 100, or both, among other various possible locations.

Also in depicted in FIG. 1, in various embodiments, each of the LiDARs 102 is coupled to a control system 120 of the vehicle 100. In various embodiments, the control system 120 is also coupled to the drive system 116 and various other systems 130 of the vehicle 100 (e.g., steering, braking, acceleration, and/or one or more other automatic safety and/or other systems and/or associated functionality for the vehicle 100). In various embodiments, the control system includes a computer processor 122 and a non-transitory, signal bearing computer memory 124. In addition, in various embodiments, the control system 120 of FIG. 1 (including the processor 122 thereof) controls various vehicle functionality (e.g., including lane keep assist, lane keep awareness, automatic braking, adaptive cruise control, forward collision alert, autonomous driving, and/or various other safety and/or other self-driving features for the vehicle 100) using point cloud information obtained from the LiDARs 102 (e.g., objects depth determination and lane detection, and/or various other functions based on the roadway, markings thereof, and/or objects thereon as captured via the LiDAR).

Figure 2:
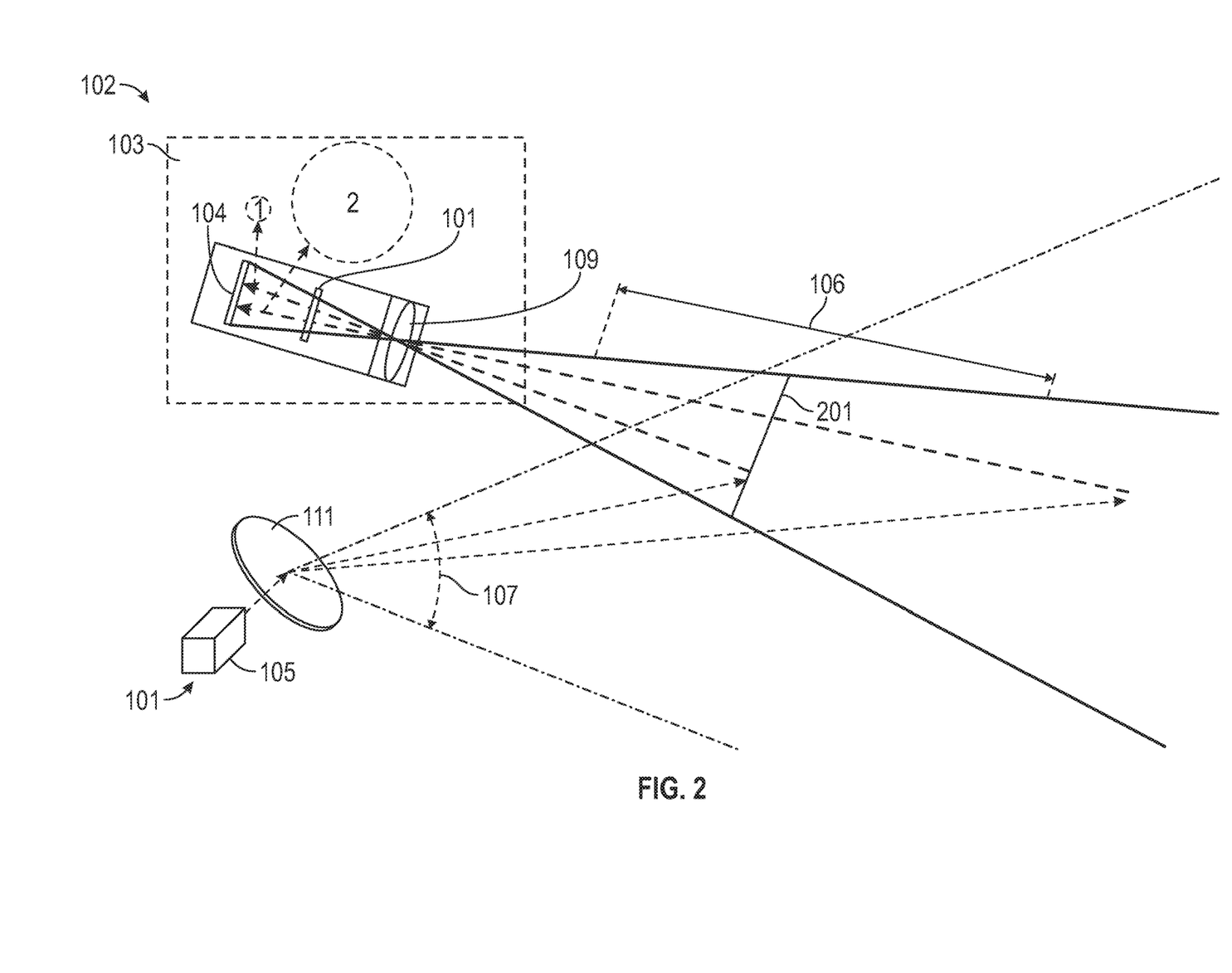
FIG. 2 is a schematic illustration of an exemplary LiDAR system for the LiDAR of FIG. 1, in accordance with an exemplary embodiment.

With reference to FIG. 2, a schematic illustration is provided for an exemplary LiDAR 102 with conventional LiDAR receiver optical layout (lens and sensor layout). As depicted in FIG. 2, the scanner 101 includes a light source 105 (e.g., a laser diode or other light source), that provide LiDAR illumination with a laser (or other light source) scanning angle 230 as depicted in FIG. 2. Also as depicted in FIG. 2, the receiver 103 includes a sensor 104 and lens assemblies 109 that provide a focal plane parallel to both sensor plane and lens plane. In various embodiments (FIGS. 3-6), the LiDAR(s) 102 of FIGS. 1 and 2 are configured, including with respect to the placement of the sensor 104 and the lens assembly 109, such that the sensor focal plane aligns with the laser (or other light source) scanning angle 107 (or primary direction of illumination for the LiDAR 102). In addition, as noted above, in various embodiments one or more lens assemblies are configured with respect to the one or more light-intensity sensors, such that that at least one sensor plane from the one or more light-intensity sensors is tilted to form a non-zero angle with at least one equivalent lens plane from the one or more lens assemblies. In certain embodiments, the LiDAR(s) also include one or more filters 101 as depicted in FIGS. 1 and 2.

FIGS. 3-6 are schematic diagrams of different exemplary LiDARs of FIG. 1, in accordance with various exemplary embodiments.

Figure 3:
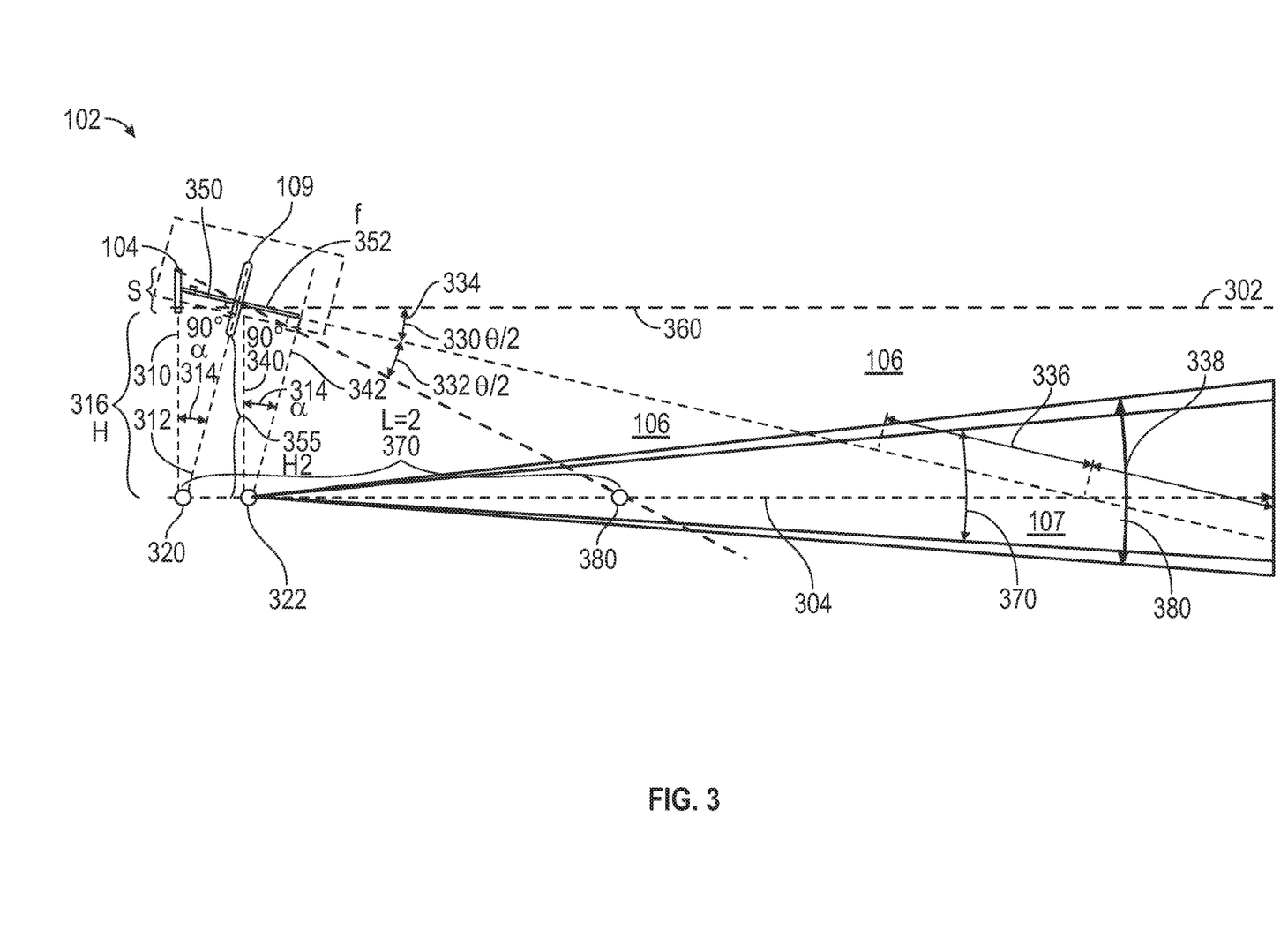
FIGS. 3-6 are schematic diagrams of different exemplary LiDAR receiver optical layouts (sensors and lenses layout) of FIG. 1, in accordance with various exemplary embodiments.

First, with reference to FIG. 3, a schematic diagram is provided for an exemplary LiDAR 102 of the vehicle 100 of FIG. 1, in accordance with an exemplary embodiment. As depicted in FIG. 3, in various embodiments, the sensor 104 and lens assembly 109 of the LiDAR are positioned with respect to one another such that the primary illumination direction of the LiDAR 102 is around the focal plane (304) and consistent with the depth of field region (wedge region). As shown in FIG. 3, in certain embodiments, the field of view is bounded at least in part by a first plane 302 and the bottom edge of the wedge region. In certain embodiments, the first plane 302 corresponds to the top edge of the sensor field of view. Also in certain embodiments, the focal plane 304 (i.e., a plane of sharp focus) is parallel to the road surface. In certain other embodiments, the focal plane 304 makes an angle between zero and twenty degrees with the road surface. In certain other embodiment, the whole layout of lenses assembly (109) and sensor (104) can be flipped over that the whole wedge region and the light illumination angle are on top of the plane 302.

Specifically, as shown in FIG. 3, the lens assembly 109 is angled with respect to the sensor 104 such that the sensor plane 310 from the sensor 104 is tilted to form a non-zero angle with at least one equivalent lens plane 312 from the lens assembly 109. Also in certain embodiments, the sensor 104 includes a focal plane 304 that makes a non-zero angle with respect to the equivalent lens plane 312 from the lens assembly 109 and the sensor plane 310 at a single intersection point 320, and forming an angle $\alpha$ (314) with respect thereto. Accordingly, in contrast to a typical assembly, the focal plane 304 is not parallel to the sensor plane 312 and the equivalent lens plane 312, but rather intersects with both at point 320.

Also as depicted in FIG. 3, in various embodiments, the focal plane 304, the parallel-to-sensor plane 340, and the front-local-plane 342 each intersect at point 322 of FIG. 3. In addition, as depicted in FIG. 2, the parallel-to-sensor plane 340 is parallel to the sensor plane 310 across the center of the lens assembly 109. Moreover, also as depicted in FIG. 3, the front-local-plane 342 is parallel to the equivalent lens plane 312, and the distance (f) 352 between the equivalent lens plane 312 and the front-local-plane 342 is equal to the focal length of the lens assembly 109.

Also as depicted in FIG. 3, in various embodiments, the focal plane 304 is aligned to be parallel to the vehicle movement direction (e.g., the first plane 302 as depicted in FIG. 3) and consistent with primary light illumination direction. Also in various embodiments, as depicted in FIG. 3, (i) a first height (H1) 316 represents a height of the sensor 104 from the focal plane 304; (ii) a second height (H2) 355 represents a height of the lens assembly 109 from the focal plane 304; (iii) a first distance ($D_i$) 350 represents an image distance; (iv) a second distance ($D_o$) 360 represents an object distance; (v) a first angle ($\theta/2$) 330 represents a first field of view angle; (vi) a second angle ($\theta/2$) 332 represents a second field of view angle; (viii) a third angle ($\theta$) 334 represents a combined field of view angle (combining both the first and second angles 330 and 332; and (ix) the depth of field 106 includes both a front depth of field 336 and a rear depth of field 338 that provide strong backscattering echo of illumination for an extended distance aligned with the laser (or other light source) scanning angle 107 (or primary direction of illumination for the LiDAR 102).

Also in accordance with the embodiment of FIG. 3, the sensor 104 and lens assembly 109 are positioned together with respect to the angle α (314) such that the resulting depth of field 106 is attained, and such that the LiDAR sensor 104 and lens assembly 109 optical layout design transfers the object plane on which the LiDAR 102 is focused to align with the laser (or other light source) scanning angle 107 (or primary direction of illumination for the LiDAR 102) to receive strong backscattering echo of illumination with a theoretically infinite distance in front of the LiDAR 102, without diminishing aperture. In various embodiments, this is based on the interrelationships of the parameters of FIG. 3 as set forth below, namely:

$\sin(\alpha) = D_f/H1$    (Equation 1) (based on the Scheimpflug principle);

$\sin(\alpha) = f/H2$    (Equation 2) (based on the Hinge rule);

$1/f = 1/D_f + 1/D_O$    (Equation 3) (based on the Gaussian optic equation);

$H1/(Di+Do) = H2/Do$    (Equation 4) (based on the focal plane being aligned with the main light illumination direction); and $\theta = 2 \cdot \tan^{-1}(S'/2 \cdot f)$    (Equation 5) (based on the angle of view equation).

Also in the embodiment of FIG. 3, the third angle (θ) 334 (also referred to as the vertical angle of view (AOV)) covers near the view point 380 (e.g., distance "L" 370 of FIG. 3 being less than five meters, in certain embodiments) through determining image size according to the angle of view equations (above). In addition, also in the embodiment of FIG. 3, the focal plane 304 (or plane of sharp focus) is parallel to the first plane 302 (which also may be referred to as the top edge of the vertical AOV, obtained through determining image distance $D_i$ 350 according to the Gaussian equations above, in order to ensure the largest vertical angel of view (AOV).

In addition, in various embodiments, the focal plane 304 is aligned with a main LiDAR light illumination direction and a direction of movement of a vehicle platform in which the LiDAR is installed (e.g., direction 108 of FIG. 1), and is also parallel to an edge plane of the field of view. Also in various embodiments, the focal plane 304 extends a theoretically infinite distance from the vehicle in both the light illuminating direction and vehicle movement direction.

Figure 4:
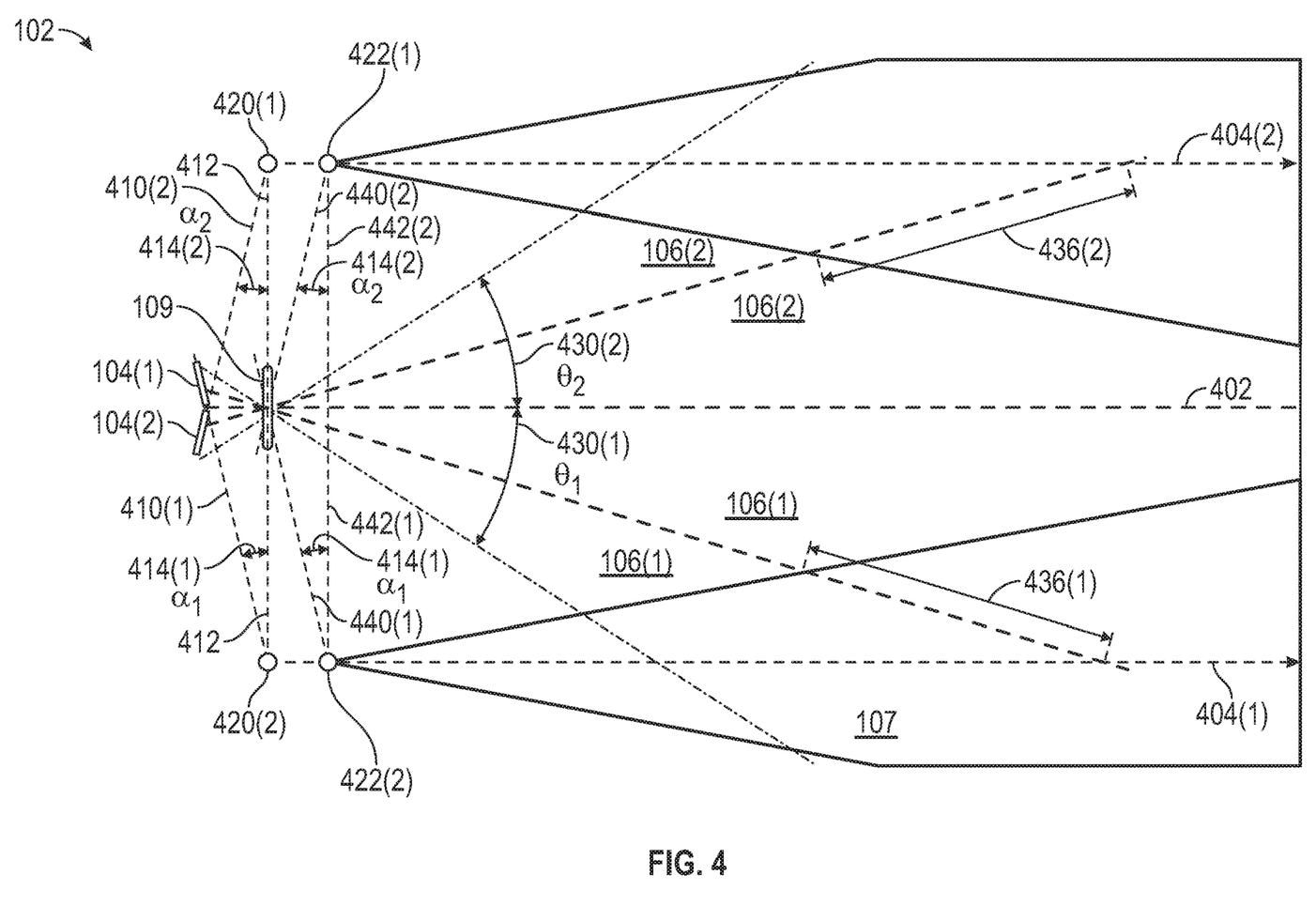

With reference to FIG. 4, a schematic diagram is provided for another exemplary LiDAR 102 of the vehicle 100 of FIG. 1, in accordance with an exemplary embodiment. As depicted in FIG. 4, in various embodiments, there are two sensors 104, namely a first sensor 104(1) and a second sensor 104(2). As shown in FIG. 4, in the depicted embodiment, the two sensors 104(1) and 104(2) are placed symmetrical to one another, with the first plane 402 being in the center. In the depicted embodiment, the first sensor 104(1) defines the LiDAR angle of view below the first plane 402, and the second sensor 104(2) defines the LiDAR receiver angle of view above the first plane 402. Also in the depicted embodiment, the two sensors 104(1) and 104(2) are utilized with the same lens assembly 109. The use of the first and second sensors increases the overall vertical angle of view to handle road topography changes.

Also as shown in FIG. 4, in the depicted embodiment, the first sensor plane 410(1) of the first sensor 104(1) and the equivalent lens plane 412 intersect with one another and a first focal plane 404(1) at intersection point 420(1), and form an angle $\alpha_1$ 414(1) with respect thereto. Similarly, the second sensor plane 410(2) of the second sensor 104(2) and the equivalent lens plane 412 intersect with one another and a second focal plane 404(2) at intersection point 420(2), and form an angle $\alpha_2$ 414(2) with respect thereto.

Also as depicted in FIG. 4, in various embodiments, the first focal plane 404(1), the parallel-to-sensor plane 440(1), and the front-local-plane 442(1) with respect to the first sensor 104(1) each intersect at point 422(1) of FIG. 4. Similarly, also in various embodiments, the second focal plane 404(2), the parallel-to-sensor plane 440(2), and the front-local-plane 442(2) with respect to the second sensor 104(2) each intersect at point 422(2) of FIG. 4.

Also as shown in FIG. 4, in the depicted embodiment, the first sensor 104(1), in combination with the lens assembly 109, generate first angles $\theta_1$ 430(1) for a first field of view on a lower half of the primary direction of illumination of the LiDAR 102 (or laser (or other light source) scanning angle 107), including a first front depth of field 436(1), and between the first plane 402 and a first focal plane (of sharpest focus) 404(1). Similarly, also as shown in FIG. 4, also in the depicted embodiment, the second sensor 104(2), in combination with the lens assembly 109, generate second angles $\theta_2$ 430(2) for a second field of view on an upper half of the primary direction of illumination of the LiDAR 102 (or laser (or other light source) scanning angle 107), including a second front depth of field 436(2), and between the first plane 402 and a second focal plane (of sharpest focus) 404(2).

In addition, in various embodiments, in accordance with FIG. 4, the vertical angles of view $\theta_1$ 430(1) and $\theta_2$ 430(2) of both the first and second sensors 104(1) and 104(2) are greater than forty degrees; (ii) the first sensor 104(1) has a first sensor plane; the second sensor 104(2) has a second sensor plane; and the single lens assembly 109 has an equivalent lens plane that forms a non-zero angle with both the first sensor plane and the second sensor plane.

Figure 5:
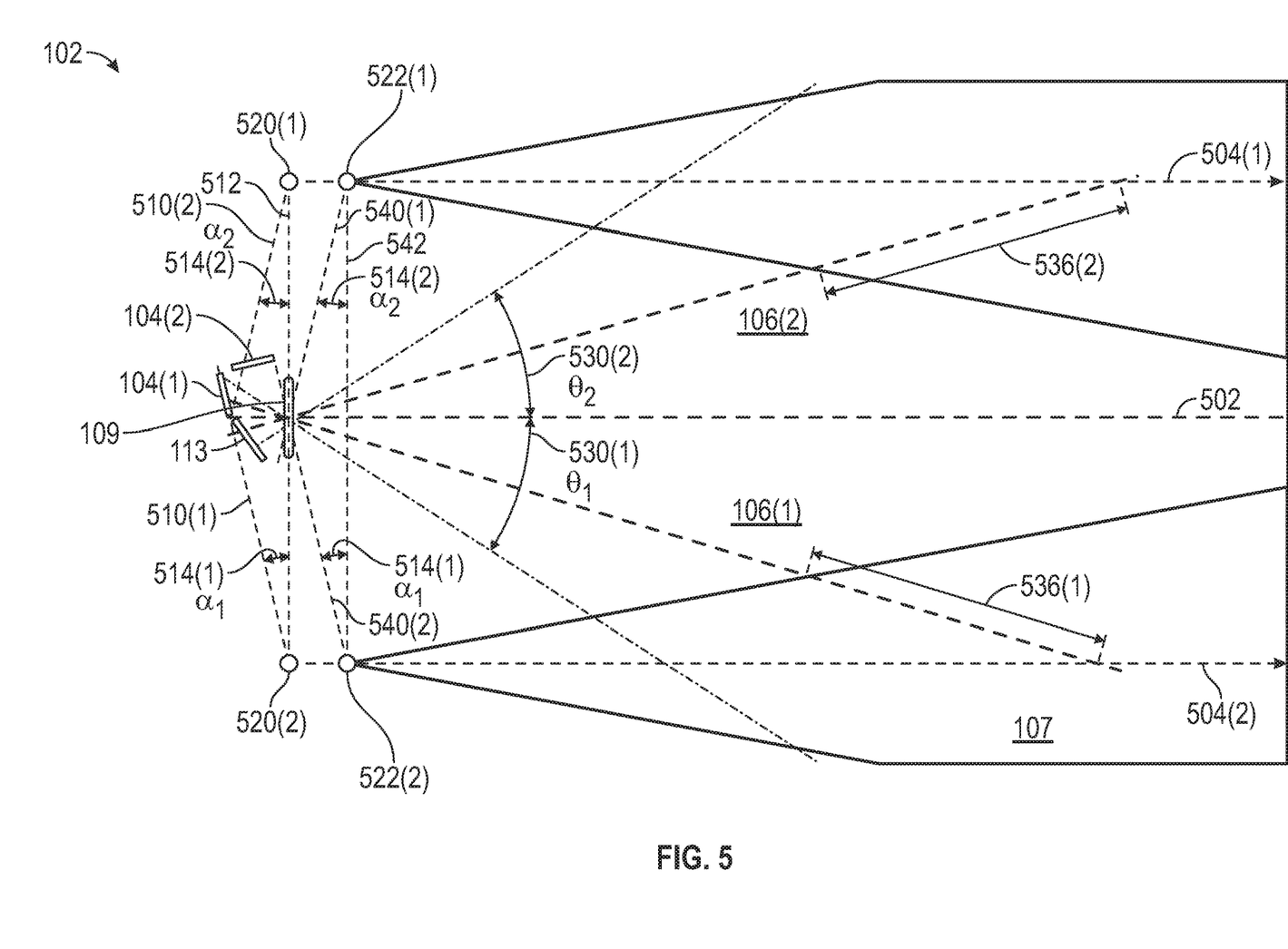

With reference to FIG. 5, a schematic diagram is provided for another exemplary LiDAR 102 of the vehicle 100 of FIG. 1, in accordance with an exemplary embodiment. As depicted in FIG. 5, in various embodiments, there is a mirror 111 in addition to the lens assembly 109 and two sensors 104 (namely, a first sensor 104(1) and a second sensor 104(2)). In various embodiments, the mirror 111 is disposed to separate the first sensor 104(1) and the second sensor 104(2). As shown in FIG. 5, the mirror 111 is added to have a forty-five degree angle with respect to the lens assembly 109, reflecting the view from one of the sensors 104. Accordingly, the sensors 104(1) and 104(2) are apart from one another, eliminating the gap between angles $\theta_1$ 530(1) and $\theta_2$ 530(2).

As shown in FIG. 5, the first sensor plane 510(1) of the first sensor 104(1) and the equivalent lens plane 512 intersect with one another and a first focal plane 504(1) at intersection point 520(1), and form an angle $\alpha_1$ 514(1) with respect thereto. Similarly, the second sensor plane 510(2) of the second sensor 104(2) and the equivalent lens plane 512 intersect with one another and a second focal plane 504(2) at intersection point 520(2), and form an angle $\alpha_2$ 514(2) with respect thereto.

Also as depicted in FIG. 5, the first focal plane 504(1), the parallel-to-sensor plane 540(1) for the first sensor 104(1), and the front-local-plane 542 each intersect at point 522(1) of FIG. 5. Similarly, also in various embodiments, the second focal plane 504(2), the parallel-to-sensor plane 540(2) for the second sensor 104(2), and the front-local-plane 542 each intersect at point 522(2) of FIG. 5.

Also as shown in FIG. 5, in the depicted embodiment, the first sensor 104(1), in combination with the lens assembly 109, generate first angles $\theta_1$ 530(1) for a first field of view 106(1) on a lower half of the primary direction of illumination of the LiDAR 102 (or laser (or other light source) scanning angle 107), including a first front depth of field 536(1), and between the first plane 502 and a first focal plane (of sharpest focus) 504(1). Similarly, also as shown in FIG. 5, also in the depicted embodiment, the second sensor 104(2), in combination with the mirror 111 and the lens assembly 109, generate second angles $\theta_2$ 530(2) for a second field of view 106(2) on an upper half of the primary direction of illumination of the LiDAR 102 (or laser (or other light source) scanning angle 107), including a second front depth of field 536(2), and between the first plane 502 and a second focal plane (of sharpest focus) 504(2).

Figure 6:
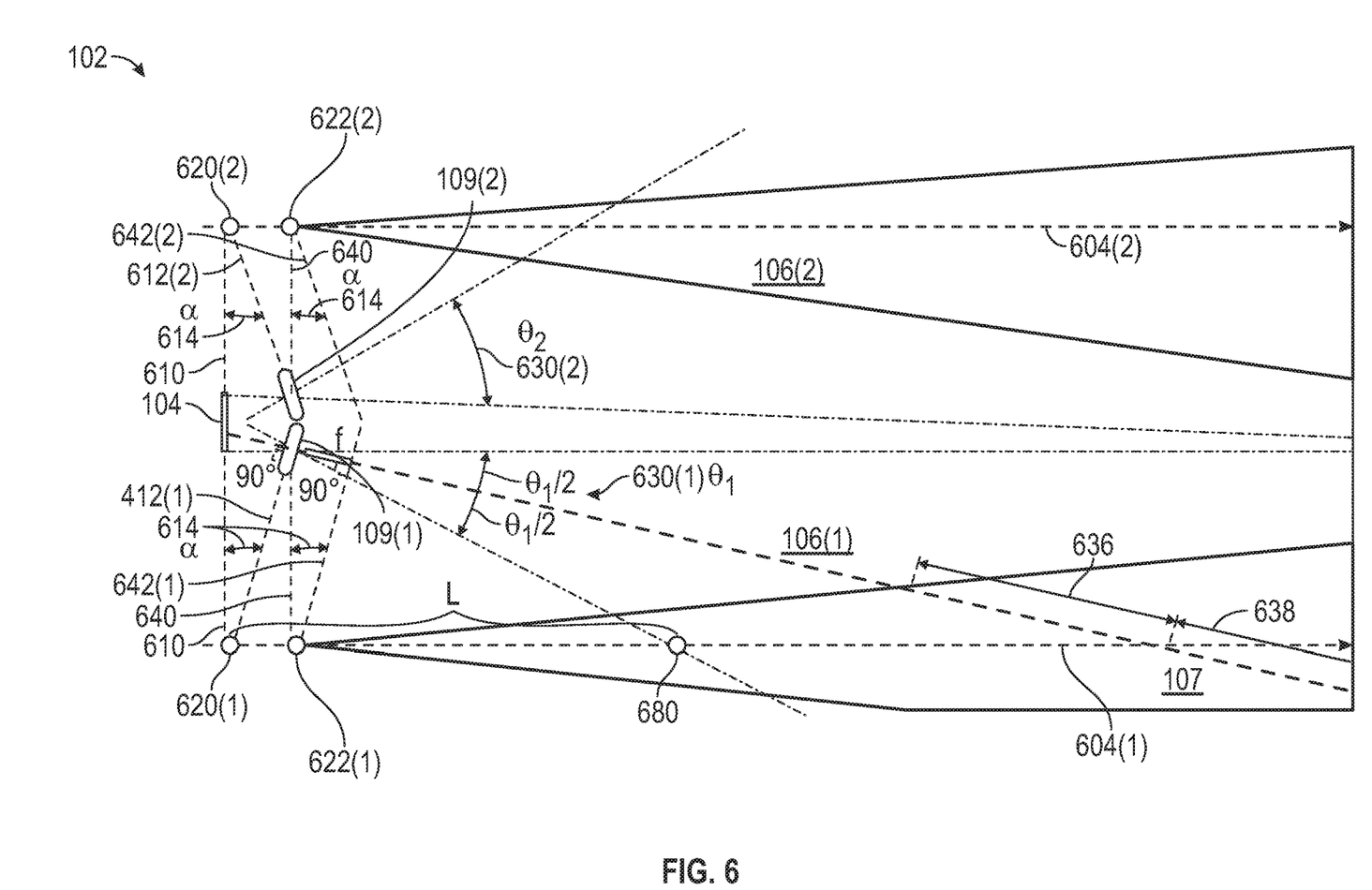

With reference to FIG. 6, a schematic diagram is provided for another exemplary LiDAR 102 of the vehicle 100 of FIG. 1, in accordance with an exemplary embodiment. As depicted in FIG. 6, in various embodiments, two lens assemblies 109 are utilized, namely a first lens assembly 109(1) and a second lens assembly 109(2), in conjunction with a single sensor 104. The use of the first and second lens assemblies increases the overall vertical angle of view to handle road topography changes.

As shown in FIG. 6, the sensor plane 610 intersects with a first equivalent lens plane 612(1) of the first lens assembly 109(1) and a first focal plane 604(1) at intersection point 620(1), and form an angle $\alpha$ 614 with respect thereto. Similarly, the sensor plane 610 intersects with a second equivalent lens plane 612(2) of the second lens assembly 109(2) and a second focal plane 604(2) at intersection point 620(2), and form an angle $\alpha$ 614 with respect thereto.

Also as depicted in FIG. 6, the first focal plane 604(1), the parallel-to-sensor plane 640, and a first front-local-plane 642(1) with respect to the first lens assembly 109(1) each intersect at point 522(1) of FIG. 6. Similarly, also in various embodiments, the second focal plane 604(2), the parallel-to-sensor plane 640, and a second front-local-plane 642(2) with respect to the second lens assembly 109(2) each intersect at point 522(2) of FIG. 6.

Also as shown in FIG. 6, in the depicted embodiment, the sensor 104, in combination with the first lens assembly 109 (1), generate first angles $\theta_1$ 630(1) for the first field of view on a lower half of the primary direction of illumination of the LiDAR 102 (or laser (or other light source) scanning angle 107), including a front depth of field 636 and a back depth of field 638, and above a first focal plane (of sharpest focus) 604(1), following a near view point 680 as shown in FIG. 6. Similarly, also as shown in FIG. 6, also in the depicted embodiment, the sensor 104, in combination with the second lens assembly 109 (2), generate second angles $\theta_2$ 630(2) for the second field of view on an upper half of the primary direction of illumination of the LiDAR 102 (or laser (or other light source) scanning angle 107), including below a second focal plane (of sharpest focus) 604(2).

In addition, in various embodiments, also with respect to FIG. 6, a vertical angle of view of the single sensor 104 is greater than forty degrees; the first lens assembly 109(1) has a first equivalent lens plane 612(1); the second lens assembly 109(2) has a second equivalent lens plane 612(2); and each of the first lens plane 612(1) and the second lens plane (612) form a non-zero angle with the sensor plane 610.

Figure 7:
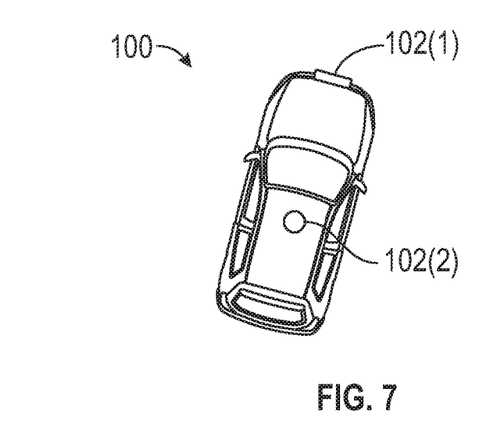
FIGS. 7 and 8 are schematic diagrams of exemplary vehicle applications of the LiDARs of FIGS. 1-6 and the vehicle of FIG. 1, in accordance with exemplary embodiments.
Figure 8:
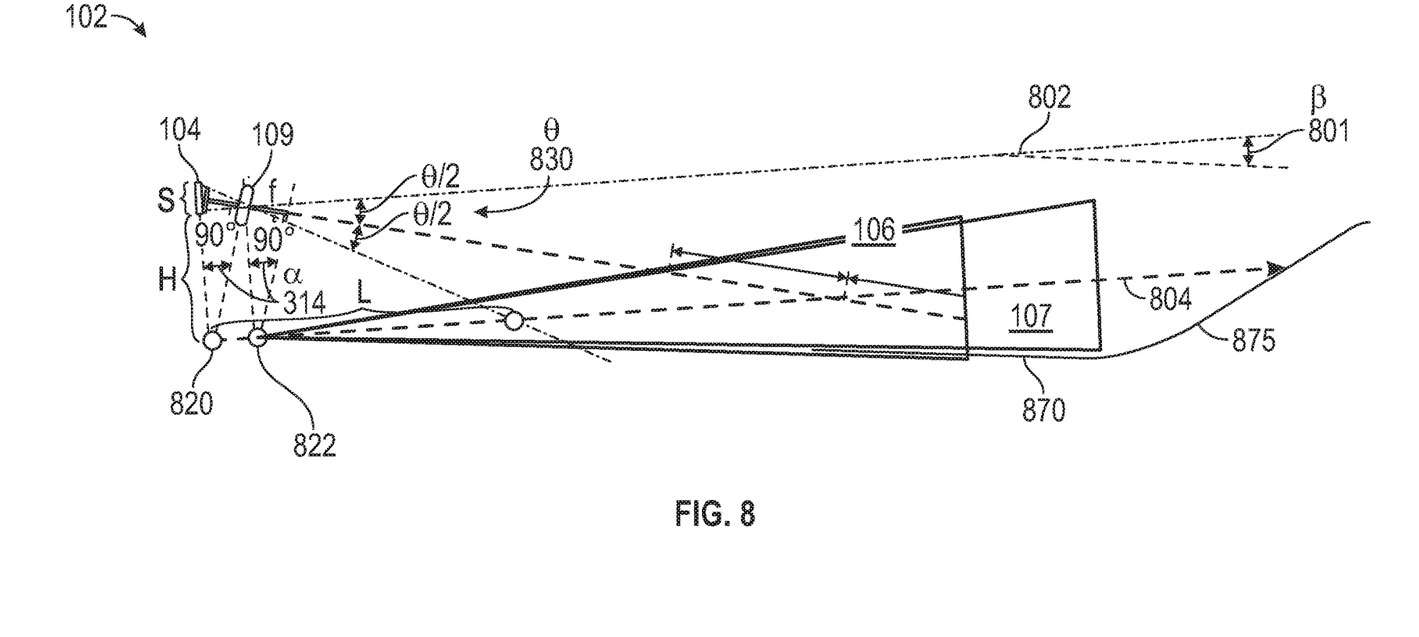

FIGS. 7 and 8 are schematic diagrams of an exemplary vehicle application and associated implementation of the LiDARs of FIGS. 1-6 and the vehicle of FIG. 1, in accordance with various exemplary embodiments.

With respect to FIG. 7, vehicle applications are provided for object depth determination and target detection (e.g. vehicle, pedestrian, lane, and so on) for the vehicle 100, in accordance with an exemplary embodiment. As shown in FIG. 7, in the depicted embodiment, two LiDARs 102 are demonstrated, including a front (first) LiDAR 102(1) (e.g., a solid state LiDAR) and a roof-mounted (second) LiDAR 102(2). These two LiDAR types are utilized either in combination on a vehicle or utilized separately in different vehicles. The application of FIG. 7 is described in greater detail below in connection with an exemplary implementation in FIG. 8 below.

Specifically, with reference to FIG. 8, a configuration for a LiDAR 102 for the application of FIG. 7 is provided, in accordance with an exemplary embodiment. In the embodiment of FIG. 8, the same sensor 104 and lens assembly 109 is provided as described above in connection with FIG. 3, and including the same angle $\alpha$ 314.

In the depicted embodiment, the entire LiDAR 102 of the embodiment of FIG. 3 (including the sensor 104 and lens assembly 109 layout) is angled to improve the capability to handle road topography changes. Specifically, in the depicted embodiment, the focal plane 804 is parallel to the first plane 802, and the first plane 802 makes an angle $\beta$ 801 with a plane 871 that is parallel to the road surface 870. In certain embodiments, the maximum value for the angle $\beta$ 801 is ten to twenty degrees, so that the LiDAR 102 will not lose the capability to receive a far enough depth of field, even with a slope 875 in the road surface 870. In the depicted embodiment, the LiDAR 102 still maintains a theoretically infinite depth. In addition, the road surface 870 is covered in the LiDAR receiver depth of field region by determining the LiDAR 102 f-stop. Also in various embodiments, the value for the angle of view (AOV) 830 is greater than thirty degrees; and the value of the angle $\beta$ 801 is between five degrees and twenty degrees. Two intersection points 820 and 822 are also depicted in FIG. 8.

In addition, in other embodiments, the vehicle application of FIG. 7 may also be implemented in connection with the LiDAR receiver configurations depicted in FIGS. 4-6 and described above in connection therewith, including having: (i) two sensors 104(1) and 104(2) and a single lens assembly 109 as set forth above with respect to FIG. 5; (ii) two sensors 104(1) and 104(2), accompanied by a mirror 111 and the lens assembly 109 as set forth above with respect to FIG. 6; and (iii) a single sensor 104, combined with two lens assemblies 109(1) as set forth above in connection with FIG. 6.

It will be appreciated that the systems, vehicles, applications, and implementations may vary from those depicted in the Figures and described herein. For example, in various embodiments, the vehicle 100, LiDAR(s) 102, control system 120, and/or other systems 130 of FIG. 1 may vary. In addition, also in various embodiments, the various embodiments, vehicle applications, and configurations of FIGS. 2-8 may also vary in different embodiments, among other possible variations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A LiDAR configured for installation in a mobile platform, the LiDAR comprising:
   a scanner comprising a light source configured to direct illumination in an illuminating direction;
   a light-intensity receiver that includes:
      one or more light-intensity sensors; and
      one or more lens assemblies configured with respect to the one or more light-intensity sensors, such that that at least one sensor plane from the one or more light-intensity sensors is tilted to form a non-zero angle with at least one equivalent lens plane from the one or more lens assemblies;
   wherein:
      an object plane on which the receiver sensor is focused to align with the main LiDAR light illumination direction;
      a focal plane is aligned parallel to the direction of movement of a mobile platform in which the LiDAR is installed; and
      the entire LiDAR light illumination volume from near to far field is around the sharpest focal plane of the LiDAR receiver;
      the one or more light-intensity sensors comprise a single light-intensity sensor;
      the one or more lens assemblies comprise a first lens assembly and a second lens assembly;
      a vertical angle of view of the single light-intensity sensor is greater than forty degrees;
      the first lens assembly has a first equivalent lens plane;
      the second lens assembly has a second equivalent lens plane;
      each of the first lens plane and the second lens plane form a non-zero angle with the sensor plane; and
      the use of the first and second, or more lens assemblies increases the LiDAR receiver field of view to handle road topography changes.

2. The LiDAR of claim 1, wherein:
   the focal plane makes a non-zero angle with respect to the equivalent lens plane from the lens assembly and the sensor plane at a single point; and
   the focal plane intersects both the sensor plane and the lens plane at a single point.

3. The LiDAR of claim 2, wherein the focal plane is:
   aligned with a main LiDAR light illumination direction and a direction of movement of a vehicle platform in which the LiDAR is installed; and
   parallel to an edge plane of the field of view.

4. The LiDAR of claim 3, wherein the focal plane extends a theoretically infinite distance from the vehicle in both the light illuminating direction and vehicle movement direction.

5. The LiDAR of claim 1, wherein the light-intensity receiver further comprises:
   a mirror.

6. A vehicle comprising:
   a body; and
   a LiDAR disposed on the body, the LiDAR comprising:
      a scanner comprising a light source configured to direct illumination in an illuminating direction; and
      a light-intensity receiver that comprises:
         one or more light-intensity sensors; and
         one or more lens assemblies configured with respect to the one or more light-intensity sensors, such that that at least one sensor plane from the one or more light-intensity sensors is tilted to form a non-zero angle between zero and ninety degrees with at least one equivalent lens plane from the one or more lens assemblies;
   wherein:
      an object plane on which the receiver sensor is focused to align with the main LiDAR light illumination direction;
      a focal plane is aligned parallel to the direction of movement of a mobile platform in which the LiDAR is installed;
      the entire LiDAR light illumination volume from near to far field is around the sharpest focal plane of the LiDAR receiver;
      the LiDAR includes a focal plane for the one or more light-intensity sensors;
      the focal plane makes a non-zero angle with respect to the equivalent lens plane from the lens assembly and the sensor plane at a single point;
      the focal plane intersects both the sensor plane and lens plane at a single point;
      the one or more light-intensity sensors from the LiDAR receiver comprise a single light-intensity sensor;
      the one or more lens assemblies from the LiDAR receiver comprise a first lens assembly and a second lens assembly;
      the first lens assembly has a first equivalent lens plane;
      the second lens assembly has a second equivalent lens plane; and
      each of the first lens plane and the second lens plane forms a non-zero angle with the sensor plane.

7. The vehicle of claim 6, wherein:
   the LiDAR receiver is tilted to form an angle that is greater than or equal to zero degrees and that is less than or equal to twenty degrees between the focal plane and the road surface to handle road topography changes while achieving a theoretically infinite depth of field for the LiDAR receiver; and
   the light illumination angle of the LiDAR scanner is titled that an entire LiDAR light illumination volume from near to far field is around a sharpest focal plane of the LiDAR receiver.

8. The vehicle of claim 6, wherein:
   a vertical angle of view of the one more light-intensity sensors is greater than forty degrees to handle road topography changes while achieving a theoretically infinite depth of field for the LiDAR receiver.

9. The vehicle of claim 6, wherein the light-intensity receiver further comprises:
   a mirror; and wherein the vertical angle of view of the receiver-sensor is greater than forty degrees to handle road topography changes while achieving a theoretically infinite depth of field for the LiDAR receiver.

10. The vehicle of claim 9, wherein:
    the vertical angle of view of one or more of the light-intensity sensors is greater than forty degrees to handle road topography changes while achieving a theoretically infinite depth of field for the LiDAR receiver.

11. The vehicle of claim 6, wherein the vehicle comprises an automobile.

12. A vehicle comprising:
    a body, including a front portion and a roof; and
    a LiDAR system comprises one or more solid state LiDARs disposed on the front portion of the body, the vehicle roof, or both; wherein each of the one or more LiDARs comprises:
       a light source configured to direct illumination in an illuminating direction; and a LiDAR receiver comprising:
  one or more light-intensity sensors; and
  one or more lens assemblies configured with respect to the one or more light-intensity sensors, such that that at least one sensor plane from the one or more light-intensity sensors is tilted to form a non-zero angle between zero and ninety degrees with at least one equivalent lens plane from the one or more lens assemblies, wherein:
the LiDAR includes a focal plane for the one or more light-intensity sensors;
the focal plane makes a non-zero angle with respect to the equivalent lens plane from the lens assembly and the sensor plane at a single point;
the focal plane intersects both the sensor plane and lens plane at a single point;
the one or more light-intensity sensors from the LiDAR receiver comprise a single light-intensity sensor;
  the one or more lens assemblies from the LiDAR receiver comprise a first lens assembly and a second lens assembly;
  the first lens assembly has a first equivalent lens plane;
  the second lens assembly has a second equivalent lens plane; and
  each of the first lens plane and the second lens plane forms a non-zero angle with the sensor plane.

13. The vehicle of claim 12, wherein the LiDAR system comprises one or more spinning LiDARs disposed on the vehicle roof.

14. The vehicle of claim 12, wherein:
  the focal plane makes a non-zero angle with respect to the equivalent lens plane from the lens assembly and the sensor plane at a single point; and
  the focal plane intersects both the sensor plane and the lens plane at a single point.

15. The vehicle of claim 14, wherein the focal plane is:
  aligned with a main LiDAR light illumination direction and a direction of movement of a vehicle platform in which the LiDAR is installed; and
  parallel to an edge plane of the field of view.

16. The vehicle of claim 15, wherein 4 the focal plane extends a theoretically infinite distance from the vehicle in both the light illuminating direction and vehicle movement direction.

17. The vehicle of claim 12, wherein the LiDAR receiver is tilted to form an angle that is greater than or equal to zero degrees and that is less than or equal to twenty degrees between the focal plane and the road surface to handle road topography changes while achieving a theoretically infinite depth of field for the LiDAR receiver.

18. The vehicle of claim 17, wherein the light illumination angle of the LiDAR scanner is titled that an entire LiDAR light illumination volume from near to far field is around a sharpest focal plane of the LiDAR receiver.

19. The vehicle of claim 12, wherein a vertical angle of view of the one more light-intensity sensors is greater than forty degrees to handle road topography changes while achieving a theoretically infinite depth of field for the LiDAR receiver.

20. The vehicle of claim 12, wherein the vehicle comprises an automobile.

* * * * *